Oct. 22, 1968  M. ATWATER  3,406,585
EIGHT-WAY MOVEMENT CONTROL
Filed March 24, 1967  2 Sheets-Sheet 1

INVENTOR
MARSHALL ATWATER
BY Semmes & Semmes
ATTORNEYS

INVENTOR
MARSHALL ATWATER
BY Semmes & Semmes
ATTORNEY

United States Patent Office 3,406,585
Patented Oct. 22, 1968

3,406,585
EIGHT-WAY MOVEMENT CONTROL
Marshall Atwater, 2 East St., Pittsboro, N.C. 27312
Filed Mar. 24, 1967, Ser. No. 625,701
7 Claims. (Cl. 74—471)

ABSTRACT OF THE DISCLOSURE

An eight way movement control of the type adapted for actuation of the hydraulic relief valves in hydraulic control systems of the type used in powering a back hoe or earth digger.

BACKGROUND OF THE INVENTION

*Field of the invention*

Hydraulic systems in conventionally operated back hoe controls include at least four relief valves which are required to be actuated upwardly and downwardly to obtain the eight movements required for actuation of the digging assembly. Conventionally, each one of these valves is operated by a vertically extending lever which is pushed forwardly or backwardly to obtain the desired upward or downward actuation of the relief valves. Training the operator in this sysetm is exceptionally difficult because the operator's hands are required to move from lever to lever and the actuation of the lever does not correspond in any psychological way to the movements desired to be obtained in the boom and shovel assembly of the back hoe.

*Description of the prior art*

An invention directed to obtain somewhat the same result with different structure is disclosed in the following prior art patent to Willinger, 3,214,040.

Willinger attempts to eliminate the four levers used in control of conventional back hoe hydraulic control systems. Willinger employs vertically extending concentric shafts, one reciprocable within the other, and each shaft having a series of tabs connected by cables to the four hydraulic relief valves. Principal shortcomings of Willinger's system are frictional difficulties encountered in the required telescoping of the shafts with respect to each other and incapability of the cables actively performing the desired mechanical function of directly opening and closing the relief valves.

SUMMARY OF THE INVENTION

According to applicant's control, one-handed operation of the four basic controls in a back hoe or shovel assembly is obtained. Furthermore, the desired eight movements are achieved by the operator's moving his hand in a mode psychologically similar to the mode achieved in moving the boom and shovel. For example, by rotating a control wheel, the hoe or shovel is opened and closed, by pivoting the column transversely about its vertical axis the boom is moved from right to left, by pivoting the control arm vertically upwardly and downwardly the hoe is raised and lowered, and by pivoting the hand-held assembly longitudinally forwardly and backwardly the boom is extended and contracted so as to move the shovel longitudinally.

According to applicant's invention, the individual relief valves are controlled by four bell cranks mounted rotatably about a fixed transverse shaft so as to give a ten to one mechanical ratio in actuating the relief valves. The free ends of the bell cranks are adapted for connection to the hydraulic valves so as to impart up and down motion. The movement translating ends of the bell cranks are connected to linkage adapted to translate the following motions to up and down movement of the free ends of the bell cranks:

(i) pivoting rotational movement about a transverse axis;
(ii) pivoting lateral movement about a vertical axis;
(iii) pivoting up and down vertical movement about a fixed transverse axis;
(iv) pivoting back and forth longtiudinal movement about a fixed transverse axis.

Since rotational, lateral, up and down and back and forth pivoting are translated to up and down movement, the entire device may be operated by one hand. In fact, the four pivoting movements may be executed simultaneously, by one hand, a virtual impossibility with the conventionally operated four-handled back hoe shovel control.

DESCRIPTION OF THE PREFERRED EMBODIMENTS

Figure 1:
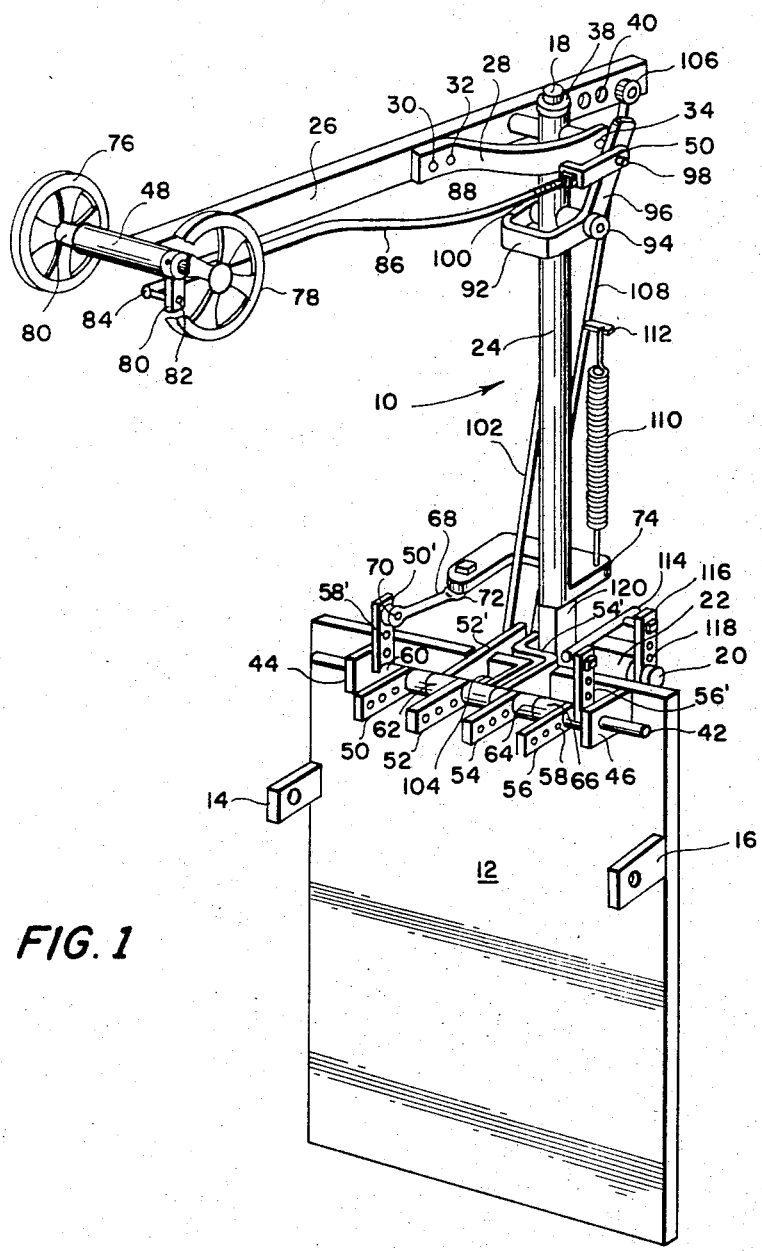
FIG. 1 is a perspective view showing the four bell cranks 50, 52, 54 and 56 mounted about counter shaft 42 supported in plate 12, the free ends of the bell cranks being available for connection to the hydraulic relief valves (not shown).
Figure 2:
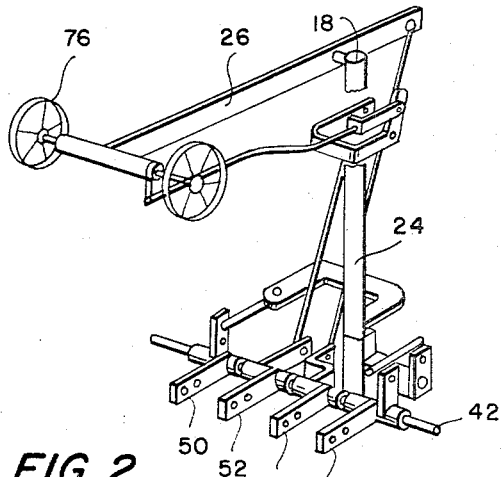
FIG. 2 is a schematic perspective, showing the device in neutral position.

In FIG. 1 there is shown an eight way control assembly 10 supported upon mounting plate 12 which has brackets 14 and 16 for securement of the plate to a tractor (not illustrated) adjacent the relief valves in the hydraulic control system. Plate 12 includes brackets 44 and 46 for supporting transversely aligned counter shaft 42. Vertical shaft 18 extends through bearing assembly 120 and is rigidly secured about transversely supported shaft 20, which extends through bearing block 22. Sleeve 24 is positioned about shaft 18 for horizontal pivoting movement and includes laterally extending crank arm 74. Horizontal control arm 26 is pivoted for up and down vertical movement about control arm shaft 34 extending from sleeve 24. Bracket 28 secured to control arm 26 by bolts 30 and 32 is connected to the control shaft 34 at its free end, the shaft 34 and its counterpart 34¹ being supported in T-like extension 36. A set screw limiting collar 38 may be employed to retain sleeve 24 against vertical actuation upon shaft 18. Control arm 26 at its open pivoted end includes adjusting holes 40. At its other T-shaped end 48 control arm 26 supports shaft 80 having open and close bucket-actuating wheels 76 and 78 rigidly secured to shaft 80. Crank 82 extends downwardly from shaft 80 and is secured by ball socket means 84 to connecting rod 86 being threaded as at 88 for securement in pivoted bracket 90. Bracket 90 is secured by counterpin means or the like to upwardly extending arm 96 of yoke 92. Yoke 92, in turn, is supported upon horizontally extending yoke shaft 94 and includes both vertically extending arm 96 and horizontally extending arm 100. A stud 98 may extend from bracket 90 through the vertically extending arm 96 and be secured thereto by means of a cotter pin or the like. Yoke connecting rod 102 is secured by ball socket means at its upper end to horizontally extending arm 100 and at its lower end is secured by cotter pin means or the like to bell crank translating end 52¹.

The free end of control arm 26 is connected by a ball socket means 106 to control arm connecting rod 108 which extends to bell crank translating end 54¹. A tension spring means 110 may be supported between laterally extending crank arm 74 and lug 112 secured to control arm 108. Thus, spring 110 limits or damps up and down pivoting of control arm 26, as well as the translated up and down movement of bell crank 54.

An L-shaped limiting collar 104 may be positioned on the counter shaft 42 intermediate bell cranks 52 and 54.

Vertical crank 116 is keyed or secured to shaft 20 and at its upper end is secured to bell crank end 56¹ by means of ball joint connecting piece 114. Adjusting holes 118 may be provided in vertical crank 116. Thus, upon longitudinal pivoting of shaft 18 forward and backwardly imparting rotational movement of shaft 20 there is obtained an up and down movement of bell crank 56.

Figure 3:
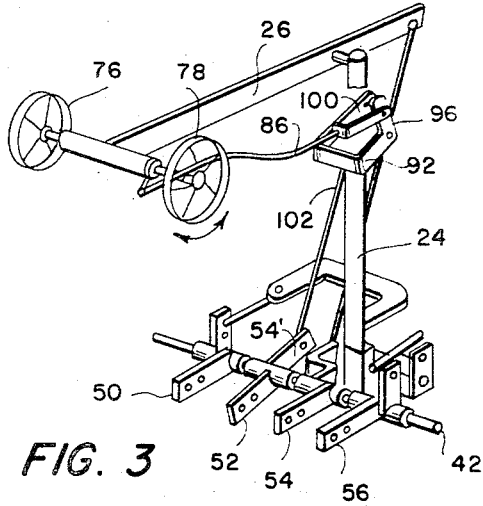
FIG. 3 is a schematic perspective, showing rotational actuation of the control wheel to obtain up and down movement of second bell crank 52.

In a typical installation the operator may place either his left or right hand on control wheel 76 or 78 and obtain movement as follows:

FIG. 3.—Rotate wheels 76 or 78, thus actuating control arm 86, yoke 92, control arm 102 and raising and lowering bell crank 52. This may be connected to the relief valve for opening and closing the bucket in a back hoe movement.

Figure 4:
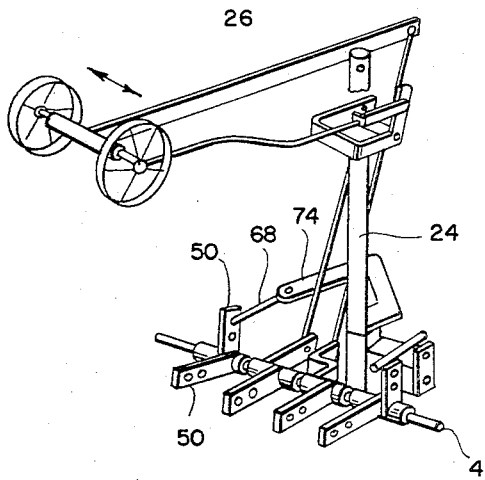
FIG. 4 is a schematic perspective showing lateral pivoting of sleeve 24 so as to obtain up and down movement of first bell crank 50.

FIG. 4.—With the hands on wheel 76 or 78 laterally pivoting control arm 26 from side to side and thereby pivoting sleeve 24 about its vertical axis so as to obtain via horizontally extending arm 74 and ball joint swivel arm 68 up and down movement of bell crank 50. In a typical back hoe assembly this may be used to obtain right and left movement of the boom.

Figure 5:
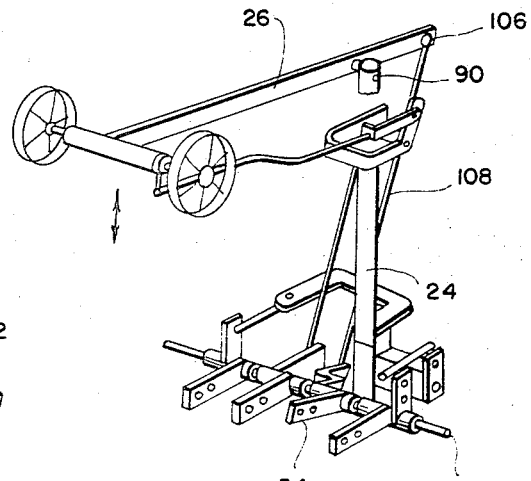
FIG. 5 is a schematic perspective showing up and down pivoting of control arm 26 so as to obtain up and down movement of third bell crank 54.

FIG. 5.—Pivoting control arm 26 upwardly and downwardly about transverse shaft 90 so as to obtain via control arm 108, up and down movement of bell crank 54; for example, raising and lowering the bucket assembly.

Figure 6:
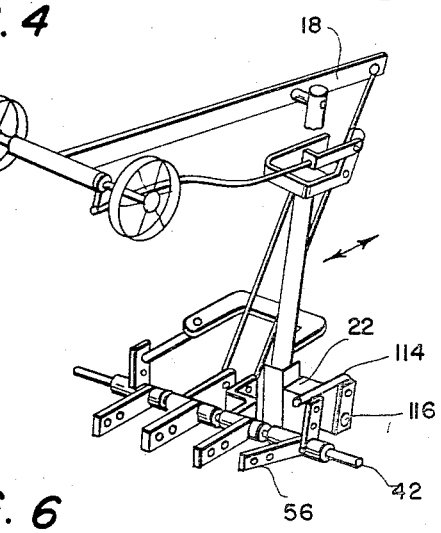
FIG. 6 is a schematic perspective showing longitudinal back and forth pivoting of shaft 18 so as to obtain up and down movement of fourth bell crank 56.

FIG. 6.—Pivoting of shaft 18 longitudinally forwardly and backwardly so as to obtain via shaft 18 ball joint connecting piece 114, upward and downward movement of bell crank 56 to obtain longitudinally forwardly and backwardly actuation of the boom assembly.

Manifestly, the disclosed structure is not restricted to the actuation only of back hoe shovel control. Also, the system may be utilized to execute control of hydraulic, electric, or pneumatic systems in controlling steam shovels, cranes, front-end loaders, as well as jet propulsion systems in carrying aircraft and persons about the space environment.

I claim:
1. A manually operated eight-way movement control comprising:
 (A) a base plate;
 (B) a counter shaft supported in said base plate;
 (C) at least four bell cranks pivoted upon said counter shaft, each of said bell cranks having:
  (i) a free end for connection to a device to be controlled upon up and down actuation, and
  (ii) a movement translating end adapted respectively for translating the following pivoting movements to up and down motion;
   (a) pivoting rotational movement about a transverse axis,
   (b) pivoting lateral movement about a vertical axis,
   (c) pivoting up and down movement about a transverse axis, and
   (d) pivoting back and forth movement about a transverse axis;
 (D) a vertical shaft pivoted for back and forth longitudinal movement about a transverse axis and secured at its base to a transverse shaft rotatably supported adjacent said base plate and connected to the movement translating end of a fourth bell crank for translating pivoting back and forth movement of said vertical shaft to up and down movement of said fourth bell crank;
 (E) a transversely pivotable sleeve rotatably supported about said vertical shaft, said sleeve being connected via swivel joint means to a first bell crank for translating pivoting lateral movement of said sleeve to up and down movement of said bell crank;
 (F) a control bar medially pivoted for up and down movement about a fixed transverse axis in said sleeve, an end of said control bar being connected to a third bell crank so as to translate up and down pivoting of said control bar to up and down movement of said third bell crank;
 (G) a control wheel pivoted for rotational movement in a fixed transverse axis at one end of said control bar, said control wheel being linked to a second bell crank for translation of pivoting rotational movement of said wheel to up and down movement of said bell crank.

2. A manually operated eight-way movement control as in claim 1, said transversely pivotable sleeve having a laterally extending arm connected via ball socket means to the translating end of said first bell crank.

3. A manually operated eight-way movement control as in claim 2, wherein the linkage intermediate said hand-operated wheel and said second bell crank includes a yoke pivoted for up and down movement on said sleeve.

4. A manually operated eight-way movement control as in claim 2, wherein the free end of said control arm is connected via ball socket means to a control arm in turn connected to said third bell crank and includes a compression spring secured intermediate said control arm and the laterally extending arm of said rotatable sleeve.

5. A manually operated eight-way movement control as in claim 4, wherein the free end of said transverse shaft secured to said vertical shaft is connected to the free end of a fourth bell crank by ball socket means, so as to translate back and forth pivoting of said vertical shaft to upward and downward movement of said fourth bell crank.

6. A manually operated eight-way movement control as in claim 5, wherein said bell crank free ends are connected to relief valves in a hydraulically operated shovel control.

7. A manually operated eight-way movement control as in claim 3, including two hand-operated control wheels pivoted for rotational movement in a fixed transverse axis at one end of said control arm, so as to be manipulable by either the left or right hand of an operator.

References Cited

UNITED STATES PATENTS 3,199,601    8/1965    Dean et al. _____ 170—135.22

FRED C. MATTERN, JR., *Primary Examiner.*

B. T. CALLAHAN, *Assistant Examiner.*